(12) United States Patent
Kusumi et al.

(10) Patent No.: US 10,902,570 B2
(45) Date of Patent: Jan. 26, 2021

(54) PROCESSING APPARATUS, PROCESSING SYSTEM, IMAGING APPARATUS, PROCESSING METHOD, AND STORAGE MEDIUM

(71) Applicant: CANON KABUSHIKI KAISHA, Tokyo (JP)

(72) Inventors: Yuichi Kusumi, Shimotsuke (JP); Chiaki Inoue, Utsunomiya (JP); Yoshiaki Ida, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 42 days.

(21) Appl. No.: 16/352,952

(22) Filed: Mar. 14, 2019

(65) Prior Publication Data
US 2019/0295235 A1    Sep. 26, 2019

(30) Foreign Application Priority Data

Mar. 22, 2018   (JP) ................................. 2018-055315

(51) Int. Cl.
   *G06T 5/50*     (2006.01)
   *G06T 7/00*     (2017.01)
   *H04N 5/235*    (2006.01)

(52) U.S. Cl.
   CPC .............. *G06T 5/50* (2013.01); *G06T 7/0002* (2013.01); *H04N 5/2354* (2013.01); *G06T 2207/10152* (2013.01); *G06T 2207/20216* (2013.01); *G06T 2207/30168* (2013.01)

(58) Field of Classification Search
   CPC ..................... G06T 5/50; G06T 7/0002; G06T 2207/30168; G06T 2207/10152; G06T 2207/20216; G06T 7/586; H04N 5/2354; H04N 5/232
   See application file for complete search history.

(56) References Cited

U.S. PATENT DOCUMENTS

| | | | |
|---|---|---|---|
| 2016/0210754 A1* | 7/2016 | Ida .......................... | G06T 7/586 |
| 2017/0046819 A1* | 2/2017 | Sambongi ............... | G06T 7/514 |
| 2018/0007291 A1* | 1/2018 | Ida .......................... | H04N 5/357 |
| 2019/0080509 A1* | 3/2019 | Bianco .................. | G06T 15/506 |
| 2020/0160593 A1* | 5/2020 | Gu .......................... | G06T 9/002 |

FOREIGN PATENT DOCUMENTS

JP          2010122158 A      6/2010

* cited by examiner

*Primary Examiner* — Nhan T Tran
(74) *Attorney, Agent, or Firm* — Rossi, Kimms & McDowell LLP (57) ABSTRACT

A processing apparatus includes an input image acquirer configured to acquire an input image obtained by capturing an object, a normal information acquirer configured to acquire normal information of the object, a first renderer configured to generate a first rendered image about the object based on a light source condition in capturing the input image and the normal information, and an area detector configured to detect a target area corresponding to a portion where an error of the normal information in the object is larger than a predetermined value based on the input image and the first rendered image.

19 Claims, 8 Drawing Sheets

PROCESSING APPARATUS, PROCESSING SYSTEM, IMAGING APPARATUS, PROCESSING METHOD, AND STORAGE MEDIUM

BACKGROUND OF THE INVENTION

Field of the Invention

The present invention relates to a processing apparatus configured to generate a rendered image.

Description of the Related Art

Image processing following imaging can generate an image based on a physical model by acquiring more physical information on an object. For example, rendering processing generates an image while changing a perspective or viewpoint of the object. The perspective (view or appearance) of the object is determined by shape information of the object, reflectance information of the object, light source information, and the like. A physical behavior of light emitted from the light source and reflected by the object depends on a local surface normal. Thus, using the surface normal of the object rather than a three-dimensional shape is especially effective.

Japanese Patent Laid-Open No. 2010-122158 discloses a photometric stereo method as a method of directly acquiring the surface normal of the object. The photometric stereo method assumes a reflection characteristic of the object based on the surface normal of the object and the direction from the object to the light source, and calculates the surface normal based on the object luminance information at a plurality of light source positions and the assumed reflection characteristic. The reflection characteristic of the object can be approximated, for example, using the Lambert diffuse reflection model according to the Lambert's cosine law.

However, in calculating the surface normal by the photometric stereo method, a normal error occurs for an object having a reflection characteristic different from the assumed reflection characteristic. A rendered image generated with the erroneous surface normal contains an error. For example, in calculating the surface normal of the object with few diffuse reflections such as metal or transparent body, by the photometric stereo method that assumes the Lambert diffuse reflection model, a particularly large normal error occurs.

When it is attempted to generate a rendered image using the acquired surface normal, the rendered image becomes incorrect and degraded.

SUMMARY OF THE INVENTION

The present invention provides a processing apparatus, a processing system, an imaging apparatus, a processing method, and a storage medium, each of which can generate a high-quality rendered image.

A processing apparatus according to one aspect of the present invention includes an input image acquirer configured to acquire an input image obtained by capturing an object, a normal information acquirer configured to acquire normal information of the object, a first renderer configured to generate a first rendered image about the object based on a light source condition in capturing the input image and the normal information, and an area detector configured to detect a target area corresponding to a portion where an error of the normal information in the object is larger than a predetermined value based on the input image and the first rendered image. A processing system according to another aspect of the present invention includes a light source unit and the above processing apparatus.

An imaging apparatus according to another aspect of the present invention includes an image sensor configured to photoelectrically convert an optical image formed via an imaging optical system and to output image data corresponding to an input image, and the above processing apparatus.

A processing method according to another aspect of the present invention includes the steps of acquiring an input image obtained by capturing an object, acquiring normal information of the object, generating a first rendered image about the object based on a light source condition in capturing the input image and the normal information, and detecting a target area corresponding to a portion where an error of the normal information in the object is larger than a predetermined value based on the input image and the first rendered image. A non-transitory computer-readable storage medium storing a program for causing a computer to execute the above processing method also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments of the present invention. Corresponding elements in each figure will be designated by the same reference numerals, and a duplicate description thereof will be omitted.

Figure 9:
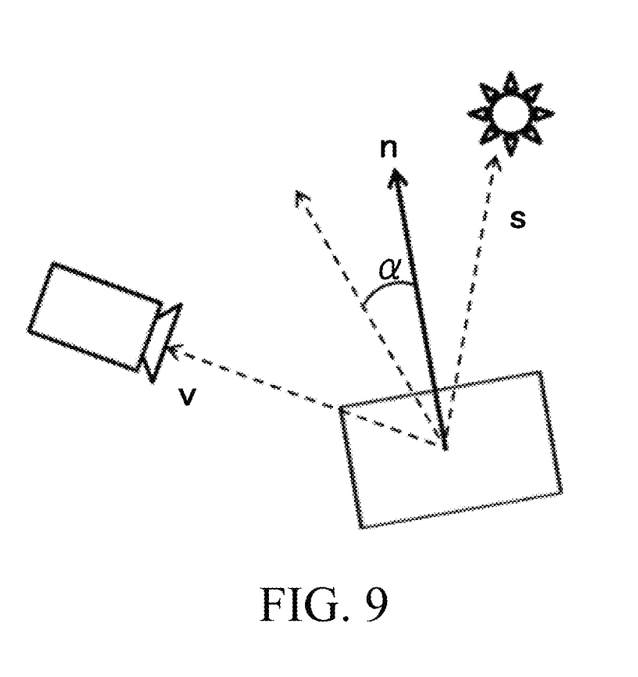
FIG. 9 explains the Torrance-Sparrow model.

The photometric stereo method is a method that assumes the reflection characteristic of the object based on the surface normal of the object and the direction from the object to the light source, and calculates the surface normal based on the reflection characteristic assumed as the object luminance information at a plurality of light source positions. When the reflectance cannot be uniquely determined with a predetermined surface normal and the light source position, the reflection characteristic can be approximated by the Lambert reflection model according to the Lambert's cosine law. FIG. 9 explains the Torrance-Sparrow model. As illustrated in FIG. 9, the specular reflection component depends on an angle $\alpha$ between a bisector of the light source vector s and the visual line direction vector v, and the surface normal n. Thus, the reflection characteristic may be based on the visual line direction. The luminance information may be obtained by capturing objects where the light source is turned on and where it is turned off, and by calculating a difference between them so as to remove the influence of the non-light source such as ambient light.

A description will now be given of the reflection characteristic assumed in the Lambert reflection model. Where i is a luminance value of the reflected light, pd is a Lambert diffuse reflectance of the object, E is an intensity of the incident light, s is a unit vector (light source direction vector) indicating the direction (light source direction) from the object to the light source, and n is a unit surface normal vector of the object, then the luminance value i is expressed by the following expression (1) from the Lambert's cosine law.

$$i = E\rho_d s \cdot n \quad (1)$$

Where s1, s2, ..., $S_M$ are components of M (M≥3) different light source vectors and $i_1, i_2, \ldots, i_M$ are luminance values of the components of the light source vector, the expression (1) is expressed by the following expression (2).

$$\begin{bmatrix} i_1 \\ \vdots \\ i_M \end{bmatrix} = \begin{bmatrix} s_1^T \\ \vdots \\ s_M^T \end{bmatrix} E\rho_d n \quad (2)$$

In the expression (2), the left side is a luminance vector of M rows and 1 column, the right side $[s_1^T, \ldots S_M^T]$ is an incident light matrix S indicating the light source direction of M rows and 3 columns, n is a unit surface normal vector of 3 rows and 1 column. In the case of M=3, $E\rho_d n$ is expressed by the following expression (3) using an inverse matrix $S^{-1}$ of the incident light matrix S.

$$E\rho_d n = S^{-1} \begin{bmatrix} i_1 \\ \vdots \\ i_M \end{bmatrix} \quad (3)$$

A norm of the vector on the left side of the expression (3) is a product of the intensity E of the incident light and the Lambert diffuse reflectance pd, and the normalized vector is calculated as the surface normal vector of the object. In other words, since the intensity E of the incident light and the Lambert diffuse reflectance pd appear in the conditional expression only in the form of the product and thus, where $E\rho_d$ is one variable, the expression (3) is regarded a simultaneous expression that determines three unknown variables including two degrees of freedom of the unit surface normal vector n. Therefore, acquiring luminance information using at least three light sources can determine each variable. When the incident light matrix S is not a regular matrix, there is no inverse matrix and it is thus necessary to select each component $s_1$ to $s_3$ in the incident light matrix S so that the incident light matrix S can be a regular matrix. In other words, the component $s_3$ may be selected linearly and independently of the components $s_1$ and $s_2$.

In the case of M>3, there are conditional expressions more than the number of unknown variables to be calculated. Therefore, the unit surface normal vector n may be calculated from three arbitrarily selected conditional expressions by the same method as that with M=3. When four or more conditional expressions are used, the incident light matrix S does not become a regular matrix and, for example, an approximate solution may be calculated using a Moore-Penrose pseudo inverse matrix. The unit surface normal vector n may also be calculated by a fitting method or optimization method.

When the unit surface normal vector n is calculated using the luminance value whose accurate value cannot be obtained due to the shading or luminance saturation out of the luminance values of components in the light source vector, it is difficult to calculate an accurate normal vector. Hence, the unit surface normal vector n may be calculated without using the luminance value whose accurate value cannot be acquired due to the shading or luminance saturation. In other words, when the luminance value $i_m$ obtained by the light source vector $s_m$ with M=m is the shading or luminance saturation, the unit surface normal vector n is calculated by excluding the light source vector $s_m$ and the luminance value $i_m$ from the expression (3). The luminance value to be excluded may be determined by a determination based on a predetermined threshold. However, as described above, at least three pieces of luminance information are required. When the reflection characteristic of the object is assumed by a model different from the Lambert reflection model, the conditional expression may be different from the linear equation for each component in the unit surface normal vector n. In this case, the fitting method and optimization method can be used once conditional expressions more than the number of unknown variables are obtained.

In addition, in case of M>3, a plurality of (from 3 to M−1 inclusive) conditional expressions can be obtained and a plurality of solution candidates of the unit surface normal vector n can be calculated. In this case, a solution may be selected from the plurality of solution candidates using still another condition. For example, the continuity of the unit surface normal vector n can be used as a condition. Where the unit surface normal n is calculated for each pixel of the imaging apparatus and n(x−1, y) is known with the surface normal at pixel (x, y) being n(x, y), a solution that minimizes the evaluation function expressed by the following expression (4) may be selected.

$$1 - n(x,y) \cdot n(x-1,y) \quad (4)$$

If n(x+1, y) and n(x, y±1) are also known, the solution that minimizes the following term (5) may be selected.

$$4 - n(x,y) \cdot n(x-1,y) - n(x,y) \cdot n(x+1,y) - n(x,y) \cdot n(x,y-1) - n(x,y) \cdot n(x,y+1) \quad (5)$$

Where there is no known surface normal and there is ambiguity of the surface normal at all pixel positions, the solution may be selected so that the sum total of all pixels of the term (5) becomes minimum, as shown in the following expression (6).

$$\sum_{x,y} \{4 - n(x, y) \cdot n(x-1, y) - n(x, y) \cdot n(x+1, y) - n(x, y) \cdot n(x, y-1) - n(x, y) \cdot n(x, y+1)\} \quad (6)$$

A surface normal at a non-closest pixel or an evaluation function weighted according to a distance from an addressed pixel position may also be used. The luminance information at an arbitrary light source position may be used for another condition. In the diffuse reflection model represented by the Lambert reflection model, the closer the unit surface normal vector and the light source direction vector are, the greater the luminance of the reflected light becomes. Thus, the unit surface normal vector can be determined by selecting a solution close to the light source direction vector in which the luminance value becomes the largest among the luminance values in the plurality of light source directions.

In the specular reflection model, the following expression (7) is established where s is the light source vector and v is the unit vector in the direction from the object to the camera (visual line vector of the camera).

$$s+v=2(v\cdot n)n \quad (7)$$

As expressed by the expression (7), if the light source direction vector s and the visual line vector v of the camera are known, the unit surface normal vector n can be calculated. With the surface roughness, the specular reflection also has a spreading exit angle. However, the angle spreads near the solution obtained as a smooth surface, and it is thus sufficient to select a candidate that is the closest to the solution to the smooth surface among the plurality of solution candidates. Alternatively, a true solution may be determined by averaging the plurality of solution candidates.

Once the surface normal n and the reflectance $\rho$ ($=E\rho_d$) are obtained by the above photometric stereo method, the luminance value i under an arbitrary light source can be calculated by giving an arbitrary light source vector s to the expression (1). In other words, a rendered image can be generated that reproduces the perspective under the arbitrary light source (the appearance of the object). In the expression (1), the rendered image with the Lambertian diffuse reflection is generated, but the rendered image may be generated with another diffuse reflection characteristic or the specular reflection characteristic in addition to it.

First Embodiment

Figure 1:
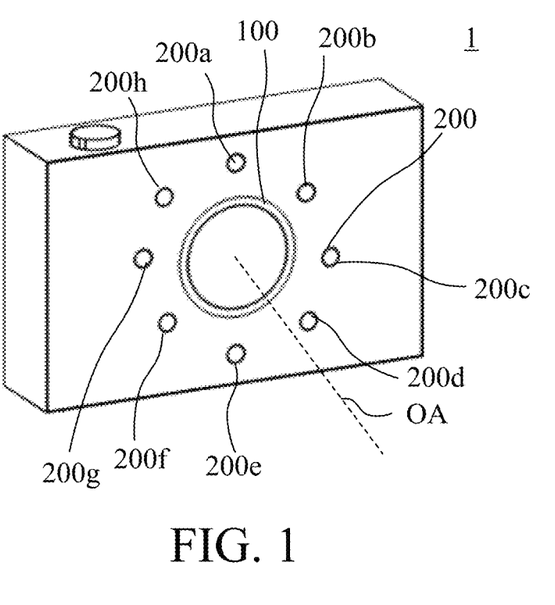
FIG. 1 is an overview of an imaging apparatus according to a first embodiment.
Figure 2A:
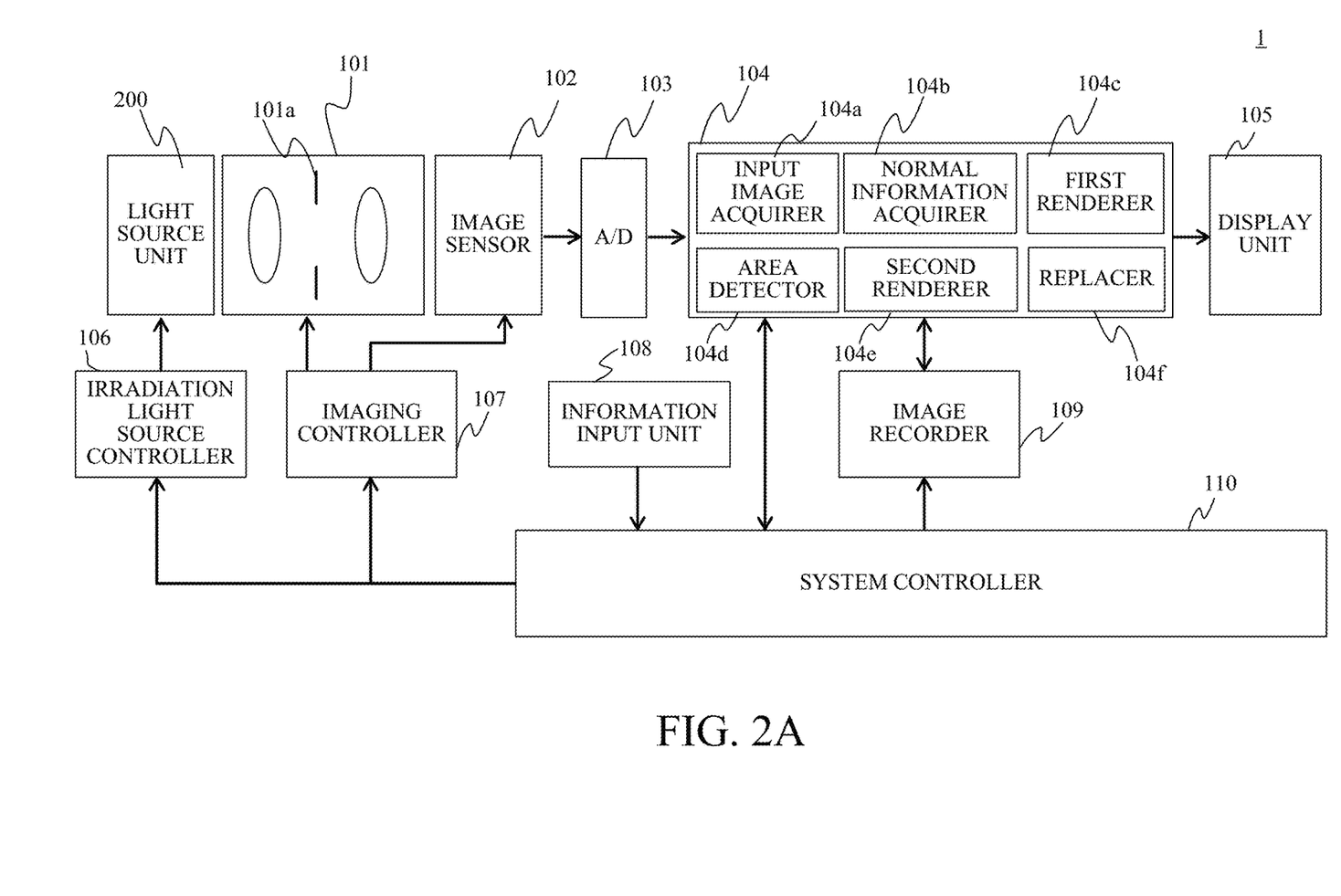
FIGS. 2A and 2B are block diagrams of the imaging apparatus and a processing system according to the first embodiment.
Figure 2B:
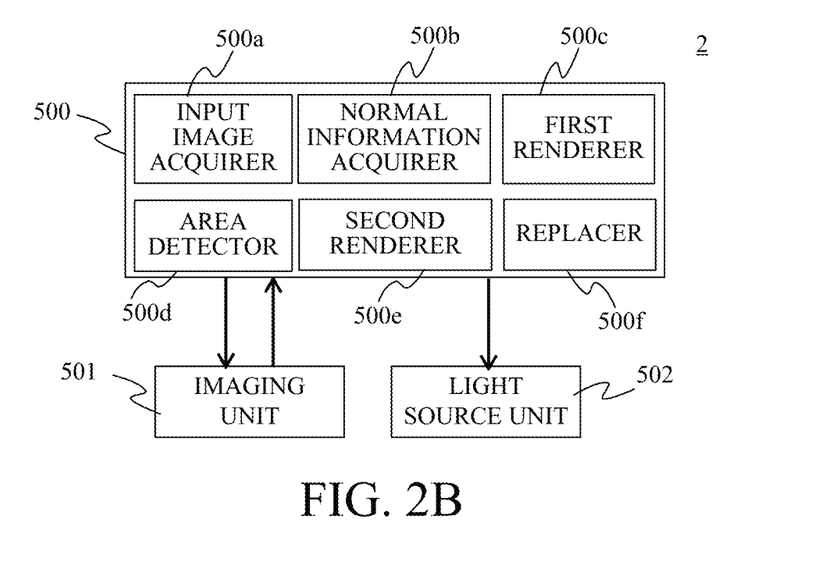

Referring now to FIGS. 1, 2A, and 2B, a description will be given of an imaging apparatus and a processing system according to a first embodiment of the present invention. FIG. 1 is an overview of an imaging apparatus 1 according to this embodiment. FIG. 2A is a block diagram of the imaging apparatus 1. FIG. 2B is a block diagram of the processing system 2.

The imaging apparatus 1 detects a target area (error area) having a large error in the normal information and replaces the target area (error area) in the rendered image with the input image, thereby generating a correct rendered image. As illustrated in FIG. 1, the imaging apparatus 1 includes an imaging unit 100 that capture an image of an object and a light source unit 200. As illustrated in FIG. 2A, the imaging unit 100 includes an imaging optical system 101 and an image sensor 102. In this embodiment, the light source unit 200 has eight light sources 200a to 200h, but the present invention is not limited to this embodiment. At least three light sources are required for the photometric stereo method, and thus at least three or more light sources are provided to acquire an input image. This embodiment concentrically arranges the eight light sources at positions equidistant from the optical axis OA in the imaging optical system in the imaging unit 100, but the present invention is not limited to this embodiment. This embodiment builds the light source unit 200 in the imaging apparatus 1, but the present invention is not limited to this embodiment. The light source unit 200 may be detachably attached to the imaging apparatus 1.

The imaging optical system 101 includes a diaphragm (aperture stop) 101a, and images light from the object on the image sensor 102. The image sensor 102 includes a photoelectric conversion element such as a CCD sensor or a CMOS sensor, and images the object. In other words, the image sensor 102 photoelectrically converts an image (optical image) of the object formed by the imaging optical system 101, and generates an analog electric signal (image data corresponding to the input image). An A/D converter 103 converts the analog signal generated by the photoelectric conversion by the image sensor 102 into a digital signal, and outputs the digital signal to an image processor 104.

The image processor (processing apparatus) 104 performs various image processing for the digital signal input from the A/D converter 103. In this embodiment, the image processor 104 calculates the normal information of the object and generates a rendered image under an arbitrary light source. The image processor 104 includes an input image acquirer 104a, a normal information acquirer 104b, a first renderer 104c, an area detector 104d, a second renderer 104e, and a replacer 104f.

The output image processed by the image processor 104 is stored in an image recorder 109 such as a semiconductor memory or an optical disk. The output image may be displayed on a display unit (display) 105. This embodiment incorporates the input image acquirer 104a, the normal information acquirer 104b, the first renderer 104c, the area detector 104d, the second renderer 104e, and the replacer 104f into the imaging apparatus 1, but may provide them separately from the imaging apparatus 1.

An information input unit 108 supplies a system controller 110 with an imaging condition (such as the F-number (aperture value), the exposure time, and the focal length) selected by the user. An imaging controller 107 acquires the image based on the information from the system controller 110 under the desired imaging condition selected by the user. An irradiation light source controller 106 controls the light emission state of the light source unit 200 according to the control instruction of the system controller 110. The information input unit 108 also supplies the system controller 110 with the light source conditions (such as the light source position, the light source intensity, and the light source color) selected by the user. Based on the information from the system controller 110, the image processor 104 generates a rendered image (a rewritten image) under a desired light source condition selected by the user. This embodiment integrates the imaging optical system 101 with the imaging apparatus 1, but the present invention is not limited to this embodiment. The present invention is also applicable to a camera system such as a single-lens reflex camera including an imaging apparatus body having an image sensor and an imaging optical system (interchangeable lens) attachable to and detachable from the imaging apparatus body.

Figure 3:
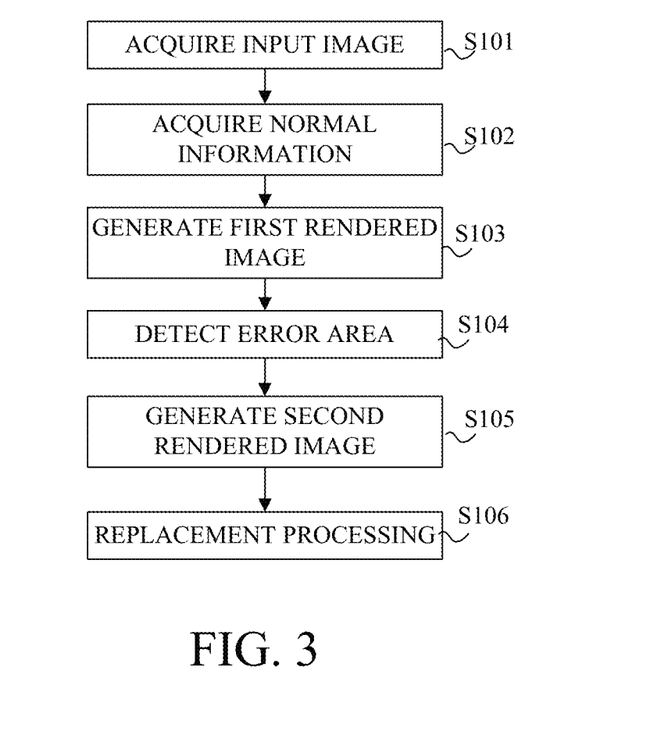
FIG. 3 is a flowchart illustrating a processing method according to the first embodiment.
Figure 4:
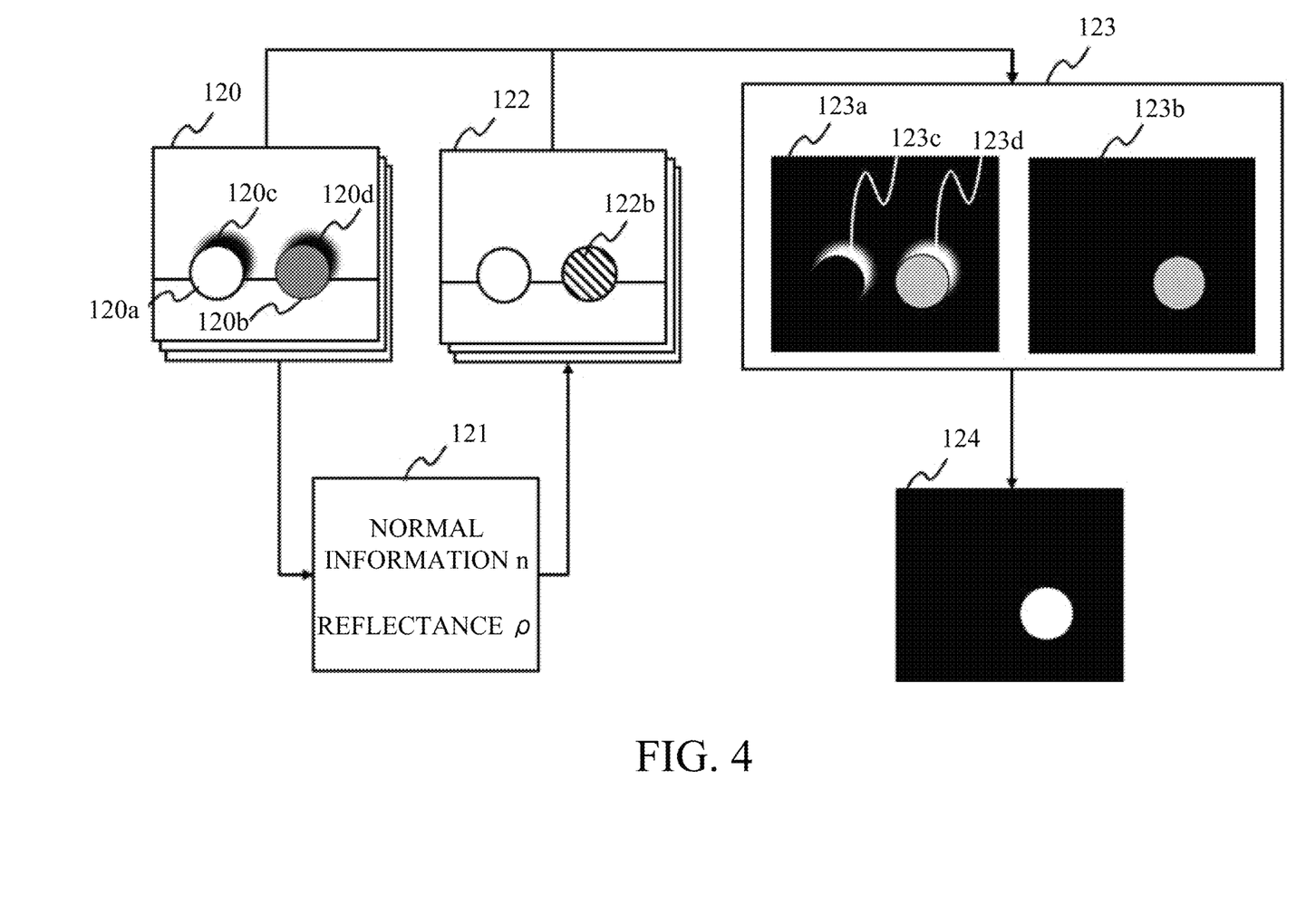
FIG. 4 explains the processing method according to the first embodiment.
Figure 5:
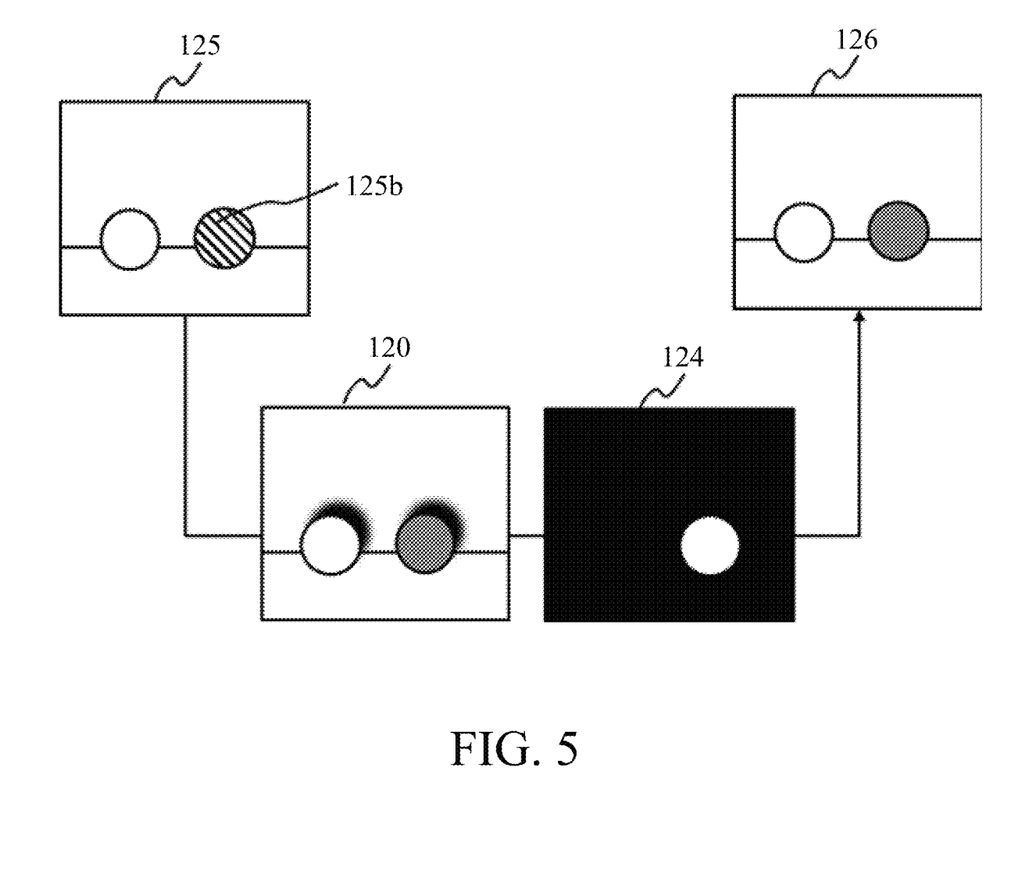
FIG. 5 explains the processing method according to the first embodiment.

Referring now to FIGS. 3 to 5, a description will be given of the rendering processing (processing method) according to this embodiment. FIG. 3 is a flowchart illustrating the rendering processing. The rendering processing according to this embodiment is executed by the system controller 110 and the image processor 104 according to a processing program as a computer program. The processing program is stored, for example, in a non-transitory computer-readable storage medium (such as an internal memory in the system controller 110). FIG. 4 explains the steps S101 to S104 in FIG. 3 in the rendering processing. FIG. 5 explains the steps S105 and S106 in FIG. 3 in the rendering processing. The steps S101 to S104 are the steps for detecting a target area (error area) having a large error in the normal information. The steps S105 and S106 are the steps for generating a correct rendering image by replacing the target area (error area) in the rendered image with the input image.

Initially, in the step S101 in FIG. 3, the input image acquirer 104a acquires a plurality of input images 120 acquired by the imaging unit 100 by imaging the object at a plurality of different light source positions. The plurality of input images 120 can be acquired by sequentially irradiating light from a single light source while changing the position of the single light source (using a driver or the like). Alternatively, the plurality of input images 120 may be obtained by sequentially irradiating light from a plurality of light sources (such as the eight light sources 200a to 200h illustrated in FIG. 1) at different positions. As illustrated in FIG. 4, the input image 120 according to this embodiment includes a diffuse sphere 120a having a diffuse property and a metal sphere 120b as an object.

In acquiring the normal information by the photometric stereo method that assumes a diffuse reflection model such as the Lambert reflection in the step S102 to be described later, a plurality of diffuse reflection images may be used in which specular reflection components have been removed from the captured image as an input image. In order to obtain the diffuse reflection image in which the specular reflection component has been removed from the image, a method based on the dichromatic reflection model can be used. However, the method of removing the specular reflection component from the image is not limited to this embodiment, and a variety of methods can be used.

Next, in the step S102, the normal information acquirer 104b acquires the normal information. More specifically, in this embodiment, the normal information acquirer 104b uses the plurality of input images 120 acquired by imaging the object at a plurality of different light source positions, and obtains the object information 121 including the normal information n and reflectance ρ of the object. The normal information n and the reflectance ρ are calculated based on the change of the luminance information at the light source position using the photometric stereo method. In this embodiment, the normal information acquirer 104b calculates the normal information n and the reflectance p, but may acquire the normal information and the reflectance calculated by another unit. The normal information acquirer 104b may calculate the normal information using the image captured under the light source condition different from those of the plurality of input images 120 acquired in the step S101. The normal information can be obtained by the photometric stereo method that assumes that the object reflection characteristic is a diffuse reflection for the diffuse sphere 120a in the input image 120. On the other hand, a large error occurs in the normal information for the metal ball 120b.

Next, in the step S103, the first renderer 104c generates a first rendered image 122 based on the normal information n and the reflectance ρ acquired in the step S102 and the light source condition when the input image 120 acquired in the step S101 was captured. In other words, the first renderer 104c generates the first rendered image 122 by reproducing the input image 120 using the obtained normal information n and the reflectance p. The first rendered image 122 is an image rendered under the same light source condition as the light source condition in which the input image 120 is imaged. The first rendered image 122 is generated by the rendering processing using the reflection characteristic assumed in calculating the normal information in the step S102. When the normal information is calculated on the assumption of the Lambert diffusion, the first renderer 104c can generate a plurality of rendering images according to the expression (1). The first rendered image 122 is any one of a rendered image corresponding to part of the plurality of input images 120 and a plurality of rendered images corresponding to all of the plurality of input images 120.

Next, in the step S104, the area detector 104d detects the target area (error area 124) based on the input image 120 acquired in the step S101 and the first rendered image 122 generated in the step S103. The target area is, for example, an area having an error of the normal information larger than a predetermined error (or value). As described above, when the surface normal is calculated by the photometric stereo method, a normal error occurs for an object having a reflection characteristic different from the assumed reflection characteristic. Thus, when a rendered image is generated using the erroneous surface normal, an error also occurs in the rendered image. In other words, a large error occurs when the surface normal of the metal ball 120b is calculated by the photometric stereo method that assumes the diffuse reflection model. Thus, when the rendered image is generated using the acquired surface normal, the first rendered image 122 contains an incorrect beveled area 122b corresponding to the metal ball 120b (or an appropriately rendered image in the beveled area 122b cannot be generated).

Accordingly, the area detector 104d detects the error area 124 based on a difference (differential image) 123 between the input image 120 acquired in the step S101 and the first rendered image 122 generated in the step S103. The area having the large difference 123 between the input image 120 and the first rendered image 122 reproducing the input image 120 is highly likely to be an object having a reflection characteristic different from the reflection characteristic assumed in the photometric stereo method.

In this embodiment, for example, the area detector 104d detects an area in which the difference 123 between the input image 120 and the first rendered image 122 is equal to or larger than a predetermined threshold, and sets the area as the error area 124. The area detector 104d may determine the error area 124 based on the normalized difference obtained by dividing the difference 123 by the input image 120 or an image based on the input image 120 such as an average value or a median value of the plurality of input images 120. Alternatively, the area detector 104d may use the normalized difference obtained by dividing the difference 123 by the reflectance p. Dividing the difference 123 by the input image 120 or the reflectance ρ can reduce or remove the influence of the brightness on the calculated difference 123.

The area detector 104d may determine the error area 124 based on a maximum difference as a maximum value in the plurality of differences 123 between the plurality of input images 120 and the plurality of first rendered images 122, or on the basis of an average difference as the average value of the plurality of differences 123. The area detector 104d may determines the error area 124 based on a normalized maximum difference or a normalized average difference obtained by dividing the maximum difference or the average difference by the input image 120 or an image based on the input image 120 such as the average value or the median value of the plurality of input images 120. Alternatively, the area detector 104d may use the normalized maximum difference or the normalized average difference obtained by dividing the maximum difference or the average difference by the reflectance p.

The rendering processing using the normal information cannot reproduce the shading generated by shielding the light. Therefore, when the difference 123 between the input image 120 and the first rendered image 122 is calculated, as illustrated in the difference (difference image) 123a, differences 123c and 123d increase in shadow areas 120c and 120d in the input image 120. The area detector 104d may detect the differences 123c and 123d as the error area 124 even if the normal information n is accurate. Accordingly, a rendered image may be generated which reproduces the shading using the shape information in addition to the normal information n. Without the shape information, the shadow areas 120c and 120d may be detected in the input image 120, and calculating the difference in the shadow area detected as indicated by the difference 123b may be avoided. The shadow areas 120c and 120d in the input image 120 can be areas in which the luminance value is equal to or less than a predetermined threshold. Alternatively, the error area 124 may be detected based on the difference between the input image 120 and the first rendered image 122 and the sign of the difference. For example, in the shadow areas 120c and 120d in the input image 120, the value obtained by subtracting the first rendered image 122 from the input image 120 becomes negative, the negative difference area is not detected as the error area 124. The area detector 104d may automatically recognize the shadow areas 120c and 120d using machine learning or the like.

Due to threshold processing to the difference 123b, the area detector 104d can acquire an area displayed in white among the detected error area 124 as a final error area 124. In this embodiment, the area detector 104d detects the error area 124 based on the difference 123 between the input image 120 and the first rendered image 122, but the present invention is not limited to this embodiment. For example, the area detector 104d may acquire the normal information n by fitting the luminance value in the plurality of input images 120, and use the obtained fitting error as a difference in detecting the error area 124.

Next, in the step S105 in FIG. 3, the second renderer 104e generates the second rendered image 125 under an arbitrary light source condition. The second renderer 104e generates the second rendered image 125, for example, under the light source condition (such as the light source position, the light source intensity, and the light source color) selected by the user. Instead of the reflection characteristic assumed in the calculation of the normal information in the step S102, the second rendered image 125 may be generated by another diffuse reflection characteristic or specular reflection characteristic in addition to it. Alternatively, the second rendered image 125 may be generated by regarding the input image as the reflectance. Similarly, a large error occurs on the surface normal of the metal ball 120b, so that the beveled area 125b corresponding to the metal ball 120b in the second rendered image 125 becomes incorrect (or an appropriately rendered image in the shadow area 125b cannot be generated).

Next, in the step S106, the replacer 104f performs the rendering processing for the error area 124 detected in the step S104 in the second rendered image 125 acquired in the step S105 using the input image 120. Thereby, the second rendered image 126 is generated in which the incorrect error area is reduced. The input image 120 used for replacement may be one of the plurality of input images or an average value of the plurality of input images. Alternatively, an input image captured under the light source condition closest to the light source condition selected in the step S105 may be used. Herein, the light source condition is the light source position, and the replacement processing to the error area 124 using the input image captured at the light source position closest to the selected light source position can reduce a shift between perspectives corresponding to light source positions for the replaced area and another area. An image having the light source condition selected in the step S105 may be generated by interpolating a plurality of input images and used for the replacement processing. A maximum value image may be used which is obtained by calculating the maximum value of the pixel value or the luminance value at each position in the plurality of input images. The shading is hardly included in the maximum value image, and may be suitable for calculating the adjustment coefficient described later.

In the second rendered image 126 in which the incorrect error area is reduced, the brightness is different between the input image 120 and the brightness of the second rendered image 125, and the brightness may be different between the replaced area and another area. Thus, the brightness of the error area 124 in the input image that receives the replacement processing may be adjusted based on the adjustment coefficient determined on the basis of the luminance value around the error area in the input image 120 and the second rendered image 125. In other words, the replacement processing is performed using a value that is made by multiplying the luminance value of the error area 124 in the input image 120 that receives the replacement processing, by dividing the luminance value around the error area in the second rendered image by the luminance value around the error area in the input image. Alternatively, blurring processing may follow the replacement processing at the boundary of the error area 124 in the second rendered image 125.

This embodiment calculates the surface normal of the object using the imaging apparatus 1 and generates the second rendered image 126 in which the incorrect error area is reduced but the present invention is not limited to this example. For example, as illustrated in FIG. 2B, the processing system 2 different from the imaging apparatus 1 may be used to generate the second rendered image 126 in which the incorrect error area is reduced. The processing system 2 illustrated in FIG. 2B includes a processing apparatus 500, an imaging unit 501, and a light source unit 502. The processing apparatus 500 includes an input image acquirer 500a, a normal information acquirer 500b, a first renderer 500c, an area detector 500d, a second renderer 500e, and a replacer 500f.

In generating the second rendered image 126 in which the incorrect error area is reduced using the processing system 2, the input image acquirer 500a initially obtains a plurality of input images 120 acquired by imaging the object at a plurality of different light source positions. Next, the normal information acquirer 500b calculates the normal information n and the reflectance ρ of the object based on the plurality of input images 120. Then, the first renderer 500c generates the first rendered image 122 based on the acquired normal information n and the reflectance ρ and the light source condition when the input image is captured. The area detector 500d detects the error area 124 based on the acquired input image 120 and the first rendered image 122. Then, the second renderer 500e generates the second rendered image 125 under the arbitrary light source condition. The replacer 500f performs the replacement processing for the error area 124 in the second rendered image 125 using the input image 120. Each of the imaging unit 501 and the light source unit 502 may be an individual device, or the light source unit 502 may be incorporated into the imaging unit 501.

This embodiment can generate a correct rendered image even using an erroneous surface normal.

Second Embodiment

Figure 6:
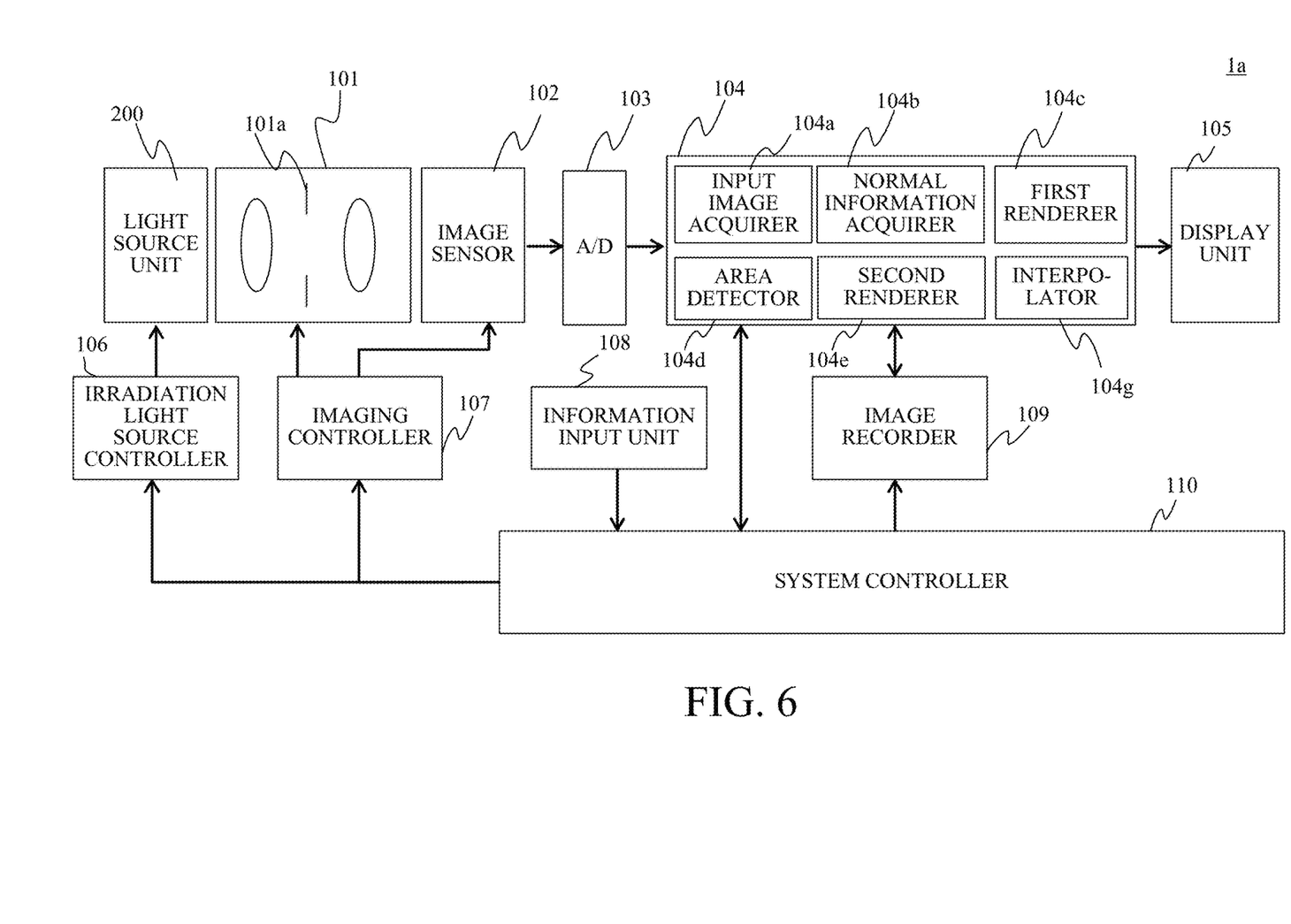
FIG. 6 is a block diagram of an imaging apparatus according to a second embodiment.

Referring now to FIGS. 6 and 7, a description will be given of a second embodiment according to the present invention. FIG. 6 is a block diagram of an imaging apparatus 1a according to this embodiment. This embodiment discusses a method of interpolating the error area in the normal information based on the periphery of the area by the interpolation processing and of generating the second rendered image using the interpolated normal information. The imaging apparatus 1a according to this embodiment is different from the imaging apparatus 1 according to the first embodiment in having an interpolator 104g instead of the replacer 104f. Since the other configuration of the imaging apparatus 1a is the same as that of the imaging apparatus 1 according to the first embodiment, a description thereof will be omitted.

Figure 7:
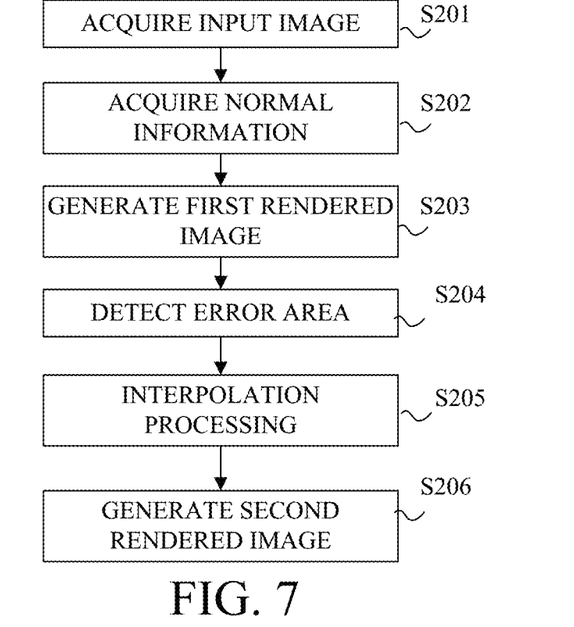
FIG. 7 is a flowchart illustrating a processing method according to the second embodiment.

FIG. 7 is a flowchart illustrating the rendering processing (processing method) according to this embodiment. The rendering processing according to this embodiment is executed by the system controller 110 and the image processor 104 according to a processing program as a computer program. The processing program is stored, for example, in a non-transitory computer-readable storage medium (such as an internal memory of the system controller 110). The steps S201 to S204 in FIG. 7 are the same as the steps S101 to S104 in FIG. 3 described in the first embodiment, and a detailed description thereof will be omitted.

In the step S205 in FIG. 7, the interpolator 104g interpolates the error area detected in the step S204 in the normal information acquired in the step S202, from the periphery of the error area by the interpolation processing. Similarly, the interpolator 104g may perform the interpolation processing for the reflectance. The interpolation processing may use a variety of methods such as a bilinear interpolation and inpainting processing using an error area as a mask.

In the step S206, the second renderer 104e generates the second rendered image under the arbitrary light source condition using the interpolated normal information and the reflectance acquired in the step S205. This embodiment can generate a rendered image in which the error of the normal information is reduced in order to generate the second rendered image using the normal information in which the error area is interpolated. This embodiment can generate a correct rendered image even using an erroneous surface normal.

Third Embodiment

Figure 8:
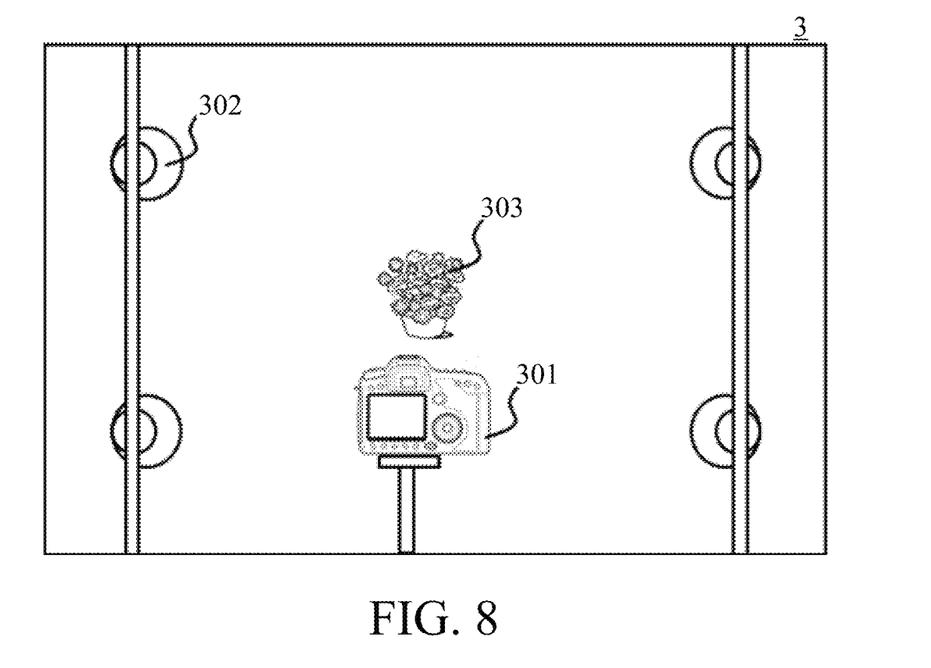
FIG. 8 is an overview of a processing system according to a third embodiment.

Referring now to FIG. 8, a description will be given of a third embodiment according to the present invention. The first and second embodiments discuss an imaging apparatus having a built-in light source, but this embodiment discusses a processing system including an imaging apparatus and a light source unit. FIG. 8 is an overview of a processing system 3. The processing system 3 includes an imaging apparatus 301 that images an object 303 and a plurality of light source units 302. The imaging apparatus 301 according to this embodiment is the same as the imaging apparatus according to the first embodiment, but a configuration incorporating a plurality of light sources is not always necessary.

The light source unit 302 may be connected to the imaging apparatus 301 by wire or wirelessly and be controlled based on information from the imaging apparatus 301. The photometric stereo method needs an image captured by sequentially irradiating the object with light form at least three light sources, but may include at least one light source unit when the light source unit is movable. However, it is necessary to move the light source for imaging with at least three different light source positions. When the light source unit 302 cannot automatically change the light source position or when the light source unit 302 cannot be controlled by the imaging apparatus 301, the user may adjust the light source unit 302 so that it may be located at the light source position displayed on the display unit in the imaging apparatus 301. Since the rendering processing according to this embodiment is the same as the processing according to the first embodiment, a detailed description thereof will be omitted.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention can provide a processing apparatus, a processing system, an imaging apparatus, a processing method, and a storage medium, each of which can generate a high-quality rendering image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-055315, filed on Mar. 22, 2018, which is hereby incorporated by reference herein in its entirety.

What is claimed is:

1. A processing apparatus comprising:
at least one memory configured to store instructions; and
at least one processor communicatively connected to the at least one memory and configured to execute the stored instructions to function as:
an input image acquirer configured to acquire an input image obtained by capturing an object;
a normal information acquirer configured to acquire normal information of the object;
a first renderer configured to generate a first rendered image about the object based on a light source condition in capturing the input image and the normal information;

an area detector configured to detect a target area corresponding to a portion where an error of the normal information in the object is larger than a predetermined value based on the input image and the first rendered image;

a second renderer configured to generate a second rendered image under an arbitrary light source condition; and a replacer configured to perform replacement processing for the target area in the second rendered image using the input image.

2. The processing apparatus according to claim 1,
wherein the input image acquirer acquires, as the input image, a plurality of input images of the object captured by sequentially irradiating the object with light from one or more light sources at a plurality of different positions, and
wherein the normal information acquirer acquires the normal information based on the plurality of input images.

3. The processing apparatus according to claim 1, wherein the first rendered image is an image rendered under the same light source condition as the light source condition in which the input image is captured.

4. The processing apparatus according to claim 1, wherein the area detector detects the target area based on a difference between the input image and the first rendered image.

5. The processing apparatus according to claim 4, wherein the area detector detects the target area further based on a sign of the difference between the input image and the first rendered image.

6. The processing apparatus according to claim 4, wherein the area detector detects the target area based on a maximum value or an average value of a plurality of differences between each of a plurality of input images and a plurality of first rendered images.

7. The processing apparatus according to claim 4, wherein the area detector detects the target area based on a normalized difference obtained by dividing the difference between the input image and the first rendered image by a reflectance or an image based on the input image.

8. The processing apparatus according to claim 4, wherein the area detector detects, as the target area, an area in which the difference between the input image and the first rendered image is equal to or larger than a predetermined threshold.

9. The processing apparatus according to claim 4, wherein the area detector detects the target area based on the difference between the input image and the first rendered image and a shadow area in the input image.

10. The processing apparatus according to claim 1, wherein the replacer performs the replacement processing for an image corresponding to a light source condition in generating the second rendered image, using an image generated by interpolating a plurality of input images.

11. The processing apparatus according to claim 1, wherein the replacer performs the replacement processing using an input image corresponding to a light source condition closest to a light source condition in generating the second rendered image among a plurality of input images.

12. The processing apparatus according to claim 1, wherein the replacer determines an adjustment coefficient based on a luminance value around the target area in the input image and the second rendered image, and adjusts brightness of the target area in the input image based on an adjustment coefficient to perform the replacement process.

13. A processing system comprising:
a light source unit; and
a processing apparatus,
wherein the processing apparatus that includes:
at least one memory configured to store instructions; and
at least one processor communicatively connected to the at least one memory and configured to execute the stored instructions to function as:
an input image acquirer configured to acquire an input image obtained by capturing an object;
a normal information acquirer configured to acquire normal information of the object;
a first renderer configured to generate a first rendered image about the object based on a light source condition in capturing the input image and the normal information;
an area detector configured to detect a target area corresponding to a portion where an error of the normal information in the object is larger than a predetermined value based on the input image and the first rendered image;
a second renderer configured to generate a second rendered image under an arbitrary light source condition; and
a replacer configured to perform replacement processing for the target area in the second rendered image using the input image.

14. The processing system according to claim 13, wherein the light source unit includes at least three light sources located at different positions, and
wherein the input image acquirer sequentially irradiates light from the at least three light sources onto the object to acquire a plurality of input images of the object captured.

15. The processing system according to claim 13, further comprising an imaging unit configured to image the object.

16. An imaging apparatus comprising:
an image sensor configured to photoelectrically convert an optical image formed via an imaging optical system and to output image data corresponding to an input image; and
a processing apparatus,
wherein the processing apparatus includes:
at least one memory configured to store instructions; and
at least one processor communicatively connected to the at least one memory and configured to execute the stored instructions to function as:
an input image acquirer configured to acquire an input image obtained by capturing an object;
a normal information acquirer configured to acquire normal information of the object;
a first renderer configured to generate a first rendered image about the object based on a light source condition in capturing the input image and the normal information;
an area detector configured to detect a target area corresponding to a portion where an error of the normal information in the object is larger than a predetermined value based on the input image and the first rendered image;
a second renderer configured to generate a second rendered image under an arbitrary light source condition; and
a replacer configured to perform replacement processing for the target area in the second rendered image using the input image.

17. A processing method comprising the steps of:
acquiring an input image obtained by capturing an object;
acquiring normal information of the object;
generating a first rendered image about the object based on a light source condition in capturing the input image and the normal information;
detecting a target area corresponding to a portion where an error of the normal information in the object is larger than a predetermined value based on the input image and the first rendered image;
generating a second rendered image under an arbitrary light source condition; and
performing replacement processing for the target area in the second rendered image using the input image.

18. A non-transitory computer-readable storage medium storing a program for causing a computer to execute a processing method, wherein the processing method includes the steps of:
acquiring an input image obtained by capturing an object;
acquiring normal information of the object;
generating a first rendered image about the object based on a light source condition in capturing the input image and the normal information;
detecting a target area corresponding to a portion where an error of the normal information in the object is larger than a predetermined value based on the input image and the first rendered image;
generating a second rendered image under an arbitrary light source condition; and
performing replacement processing for the target area in the second rendered image using the input image.

19. A processing apparatus comprising:
at least one memory configured to store instructions; and
at least one processor communicatively connected to the at least one memory and configured to execute the stored instructions to function as:
an input image acquirer configured to acquire an input image obtained by capturing an object;
a normal information acquirer configured to acquire normal information of the object;
a first renderer configured to generate a first rendered image about the object based on a light source condition in capturing the input image and the normal information;
an area detector configured to detect a target area corresponding to a portion where an error of the normal information in the object is larger than a predetermined value based on the input image and the first rendered image;
an interpolator configured to perform interpolation processing for the target area in the normal information; and
a second renderer configured to generate a second rendered image under an arbitrary light source condition based on the normal information of the target area obtained by the interpolation processing.

* * * * *